(12) United States Patent
Kim et al.

(10) Patent No.: US 11,437,170 B2
(45) Date of Patent: Sep. 6, 2022

(54) SELF-EXTINGUISHING POWER CABLE WITH MICROCAPSULES AND METHOD FOR MANUFACTURING SAME

(71) Applicants: KOREA ELECTRIC POWER CORPORATION, Naju-si (KR); Dong-Woo Kim, Seongnam-si (KR)

(72) Inventors: Dong-Woo Kim, Daejeon (KR); Sung-Min Kim, Seoul (KR); O-Deuk Kwon, Andong-si (KR); Young-Sung Kim, Suwon-si (KR); Il-Joo Mun, Gwangju-si (KR)

(73) Assignees: KOREA ELECTRIC POWER CORPORATION, Naju-si (KR); Dong-Woo Kim, Seongnam-si (KR)

( * ) Notice: Subject to any disclaimer, the term of this patent is extended or adjusted under 35 U.S.C. 154(b) by 403 days.

(21) Appl. No.: 16/331,534

(22) PCT Filed: Aug. 2, 2017

(86) PCT No.: PCT/KR2017/008356
§ 371 (c)(1),
(2) Date: Mar. 8, 2019

(87) PCT Pub. No.: WO2018/216851
PCT Pub. Date: Nov. 29, 2018

(65) Prior Publication Data
US 2019/0206592 A1   Jul. 4, 2019

(30) Foreign Application Priority Data

May 22, 2017  (KR) .................. 10-2017-0062905

(51) Int. Cl.
*H01B 7/295*  (2006.01)
*H01B 13/00*  (2006.01)
(Continued)

(52) U.S. Cl.
CPC ......... *H01B 13/0026* (2013.01); *H01B 3/302* (2013.01); *H01B 7/285* (2013.01);
(Continued)

(58) Field of Classification Search
CPC .................. H01B 9/027; H01B 7/295
See application file for complete search history.

(56) References Cited

U.S. PATENT DOCUMENTS 3,795,540 A * 3/1974 Mildner ................. B32B 15/08
428/215
3,935,042 A * 1/1976 Wahl ........................ H01B 7/02
156/56

(Continued)

FOREIGN PATENT DOCUMENTS

CN    103952860 A    7/2014
JP    62-176006 A    8/1987

(Continued)

OTHER PUBLICATIONS

An Office Action dated May 20, 2020 in the corresponding European Patent Application No. 17910818.8.

(Continued)

*Primary Examiner* — Chau N Nguyen
(74) *Attorney, Agent, or Firm* — Foundation Law Group, LLP

(57) ABSTRACT

Disclosed is a self-extinguishing power cable with microcapsules and a method for manufacturing the same. A method of manufacturing a self-extinguishing power cable with a microcapsule, the method includes applying a mixed solution of water-soluble adhesive, a magnetic powder and a swellable powder on one surface of a first nonwoven fabric; magnetically treating and drying the first nonwoven fabric; pressing one surface of a second nonwoven fabric on the one surface of the first nonwoven fabric to form a single (Continued)

nonwoven fabric; and forming the single nonwoven fabric into a neutral conductor water blocking layer of an electrical power cable to manufacture the electrical power cable, wherein the microcapsule is provided between the first nonwoven fabric and the second nonwoven fabric.

7 Claims, 5 Drawing Sheets

(51) Int. Cl.
    *H01B 3/30*     (2006.01)
    *H01B 7/285*     (2006.01)
    *H01B 9/02*     (2006.01)
    *H01B 7/282*     (2006.01)
    *H01B 3/44*     (2006.01)

(52) U.S. Cl.
    CPC ........... *H01B 7/2825* (2013.01); *H01B 7/295* (2013.01); *H01B 9/027* (2013.01); *H01B 3/441* (2013.01); *Y02A 30/14* (2018.01)

(56) References Cited

U.S. PATENT DOCUMENTS

| | | | | |
|---|---|---|---|---|
| 4,029,830 A * | 6/1977 | Yamamoto | ........... | H01B 7/0275 427/487 |
| 4,042,776 A * | 8/1977 | Matsuba | ................ | H01B 3/441 174/11 OR |
| 4,230,808 A * | 10/1980 | Pietersen | ............. | A62D 1/0021 428/321.5 |
| 7,244,893 B2 * | 7/2007 | Clark | ..................... | H01B 7/295 174/113 R |
| 9,968,813 B2 * | 5/2018 | Bliznets | ................ | A62D 1/0021 |
| 2003/0164483 A1 | 9/2003 | Scelza et al. | | |
| 2014/0326478 A1 * | 11/2014 | Maioli | ................. | H02G 3/0418 174/24 |
| 2018/0158570 A1 * | 6/2018 | Lee | .................... | C09J 123/0869 |

FOREIGN PATENT DOCUMENTS

| | | |
|---|---|---|
| JP | 05-084873 A | 4/1993 |
| JP | 06-045216 U | 6/1994 |
| JP | 2007-319350 A | 12/2007 |
| JP | 2009-160387 A | 7/2009 |
| JP | 2010-265347 A | 11/2010 |
| KR | 10-2004-0038180 A | 5/2004 |
| WO | 2016206715 A1 | 12/2016 |

OTHER PUBLICATIONS

An Office Action dated Dec. 18, 2019 in the corresponding Chinese Patent Application No. 201780055161.2.

* cited by examiner

SELF-EXTINGUISHING POWER CABLE WITH MICROCAPSULES AND METHOD FOR MANUFACTURING SAME

CROSS REFERENCE TO RELATED PATENT APPLICATIONS

This application claims the benefit under 35 U.S.C. Section 371, of PCT International Application No. PCT/KR2017/008356, filed on Aug. 2, 2017 which claimed priority to Korean Patent Application No. 10-2017-0062905 filed on May 22, 2017, the disclosures of which are hereby incorporated by the references.

TECHNICAL FIELD

The present invention relates to a self-extinguishing power cable with a microcapsule and a method of manufacturing the same, and more specifically, to a self-extinguishing power cable in which a water blocking layer coated with a microcapsule is provided below an outer sheath layer of the power cable, thereby extinguishing a flame of an electrical power cable and preventing a serious of occurrences of fire, and a method of manufacturing the same.

BACKGROUND ART

Power cables include an underground power transmission cable, a power distribution cable, and a power lead cable and are used in buildings such as skyscrapers, power plants, various plants, power tunnels for power transmission, and utility tunnels.

In the power cables, except for a metallic conductor component (copper or aluminum), most of the remaining sheath components are polymer materials such as polyurethane (PE), polypropylene (PP), cross-linked polyethylene (XLPE), and polyvinyl chloride (PVC). However, when a temperature is increased to a specific critical temperature or higher, the polymer materials may have volatility and thus may become a factor which causes fire.

For this reason, more power cables are using a flame retardant sheath material. That is, a flame retardant function is conferred to an outer sheath of a power cable to ensure flame retardancy for fire prevention. For example, a power cable with a flame retardant outer sheath is a halogen-free flame retardant concentric neutral type cross-linked polyethylene (FR-CNCO) cable including a polyolefin resin outer sheath, which satisfies the requirements of IEC-60332-3 Category A, Category B, or Category C. As described above, a flame retardant outer sheath for suppressing the spread of fire and retarding the fire in case of fire in power cables is applied to most of the power cables.

The conventional power cables may be implemented as a fire-proof cable by adding a mica tape layer to a conductor for fire resistance. However, in this case, due to a large amount of an insulator and a weight of a conductor, it is difficult to implement the mica tape layer in a power cable for a voltage of 22.9 kV or more.

In addition, the conventional power cables use a silicon insulator and may maintain an insulating function due to a ceramic state of the silicon insulator in case of fire. However, in this case, the silicon insulator may be used only in a low voltage power cable for a voltage of 600 V, and there is a limitation in applying the silicon insulator in a power cable for a voltage of 22.9 kV or more.

Therefore, even when an outer sheath of the conventional power cables has flame retardancy, only the spread of fire may be suppressed and cable fire may not be fundamentally prevented or suppressed. Accordingly, there is a need to implement a self-extinguishing function in a power cable.

This is proposed in Japanese Patent Application Laid-Open No. 2010-265347 titled "FLAME RETARDANT RESIN COMPOSITION AND FLAME RETARDANT WIRE USING THE SAME."

DISCLOSURE

Technical Problem

The present invention is directed to providing a self-extinguishing power cable in which a water blocking layer coated with a microcapsule is provided below an outer sheath layer of the power cable, thereby extinguishing a flame of an electrical power cable and preventing a serious of occurrences of fire, and a method of manufacturing the same.

Technical Solution

According to an embodiment of the present invention, a self-extinguishing power cable with a microcapsule includes a conductive layer which has a water blocking structure of a compact-rounded stranded copper filled with a water blocking compound from a center thereof; an inner semiconductive layer which is formed on the conductive layer and is made of a semiconductive thermosetting high-purity compound material; an insulating layer which is formed on the inner semiconductive layer and is made of a tree retardant cross-linked polyethylene compound material; an outer semiconductor layer which is formed on the insulating layer and is made of a semiconductive thermosetting high-purity compound material; a first neutral conductor water blocking layer which is formed on the outer semiconductive layer and is a semiconductive swellable tape; a concentric neutral conductor which is formed on the first semiconducting layer and is an annealed copper wire; a second neutral conductor water blocking layer which is formed on the concentric neutral conductor and is a swellable tape; and an outer sheath layer which is formed on the second neutral conductor water blocking layer and is made of polyvinyl chloride (PVC) or polyethylene material, wherein a microcapsule filled with an active agent for extinguishing a flame is applied on at least one of the first neutral conductor water blocking layer and the second neutral conductor water blocking layer.

The microcapsule may have a size of 5 μm to 100 μm and an allowable breakdown temperature of 90° C. and 150° C.

A capsule wall of the microcapsule may include one material selected from among a melamine resin, a urethane resin, fumed silica, and a mixture of two or more thereof.

The active agent may include one selected from among a liquid extinguishing agent such as fluorocetone (dedecafluoro-2-methylpentan-3-one), gas extinguishing agents such as carbon dioxide ($CO_2$) and chlorofluorocarbon (CFC), and a mixture of two or more thereof.

The swellable tape of each of the first neutral conductor water blocking layer and the second neutral conductor water blocking layer may be formed by applying a superabsorbent polymer (SAP) on a nonwoven fabric made of a polyester material.

Carbon black may be applied on the swellable tape of the first neutral conductor water blocking layer.

The self-extinguishing power cable with the microcapsule may further include a metal shielding layer disposed below the outer sheath layer.

According to an embodiment of the present invention, a method of manufacturing a self-extinguishing power cable with a microcapsule includes applying a mixed solution of water-soluble adhesive, a magnetic powder and a swellable powder on one surface of a first nonwoven fabric; magnetically treating and drying the first nonwoven fabric; pressing one surface of a second nonwoven fabric on the one surface of the first nonwoven fabric to form a single nonwoven fabric; and forming the single nonwoven fabric into a neutral conductor water blocking layer of an electrical power cable to manufacture the electrical power cable, wherein the microcapsule is provided between the first nonwoven fabric and the second nonwoven fabric and is mixed into the mixed solution to be applied in any one case of a case in which the microcapsule is applied on the one surface of the first nonwoven fabric, a case in which the microcapsule is applied on the one surface of the second nonwoven fabric, and a case in which the microcapsule is sprayed in a form of powder on the one surface of the first nonwoven fabric before the drying.

The mixed solution may include carbon black.

Advantageous Effects

According to the present invention, a water blocking layer coated with a microcapsule is provided below an outer sheath layer of a power cable, thereby extinguishing a flame of an electrical power cable and preventing a serious of occurrences of fire.

In addition, according to the present invention, a microcapsule is applied to low-to-extra-high voltage cables, thereby providing a self-extinguishing function as well as a flame retarding function in case of fire.

Furthermore, according to the present invention, when a power cable is manufactured, although an outer sheath layer is injection-molded, a power cable with a self-extinguishing function can be manufactured without breaking a microcapsule.

MODES OF THE INVENTION

Figure 1:
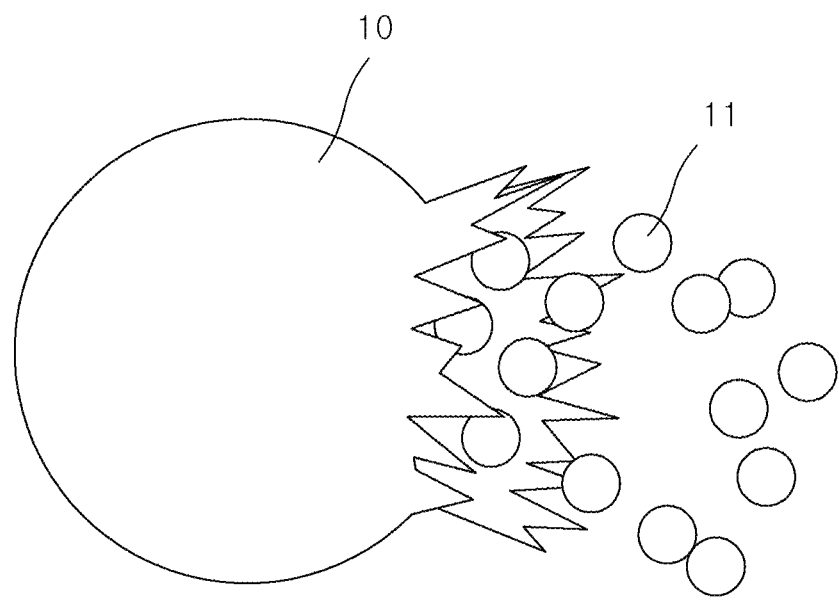
FIG. 1 is a view illustrating a microcapsule according to an embodiment of the present invention.

To fully understand the present invention, exemplary embodiments of the present invention will be described with reference to the accompanying drawings. The embodiments of the present invention may be modified in many different forms and the scope of the present invention should not be construed as being limited to the embodiments detailed below. The present embodiment is provided to further illustrate the present invention to those of ordinary skill in the art. Therefore, the shape of elements in the drawings and the like may be exaggerated to emphasize a clearer description. It should be noted that in the drawings, the same elements are denoted by the same reference numerals. Publicly known functions and configurations that are judged to unnecessarily obscure the purport of the present invention will not be described.

FIG. 1 is a view illustrating a microcapsule according to an embodiment of the present invention.

As shown in FIG. 1, a microcapsule 10 according to the embodiment of the present invention is filled with an active agent 11 as an extinguishing agent which is applied on a portion which is on fire so as to extinguish a flame.

The microcapsule 10 may be included in a power cable and may be broken at flame temperature to provide a self-extinguishing function in which the active agent 11 filling the microcapsule 10 is sprayed on a portion which is on fire so as to extinguish a flame.

The microcapsule 10 has a size of 5 μm to 100 μm and an allowable breakdown temperature of 90° C. and 150° C. As described above, a capsule wall of the microcapsule 10 is broken at the allowable breakdown temperature, and thus, the active agent 11 filling the microcapsule 10 is exposed to the outside.

A material of the capsule wall of the microcapsule 10 may be one selected from among a melamine resin, a polyurethane resin, a polyurea resin, an acrylic resin, a fumed silica, and a mixture of two or more thereof.

The active agent 11 may include one selected from among a liquid extinguishing agent such as fluorocetone (dedecafluoro-2-methylpentan-3-one), gas extinguishing agents such as carbon dioxide ($CO_2$) and chlorofluorocarbon (CFC), and a mixture of two or more thereof. In addition, commercially available products. such as Novec 1230 fluid (FK-5-1-12)™ manufactured by 3M Company and FM-200 (HFC 227ea)™ and FE-25 (HFC-125)™ manufactured by DuPont Company, may be used as the active agent 11. The microcapsule 10 is filled with the active agent 11 to a desired amount according to an internal volume of the microcapsule 10. An amount of the active agent 11 is adjusted by adjusting an amount of the microcapsule 10.

Figure 2:
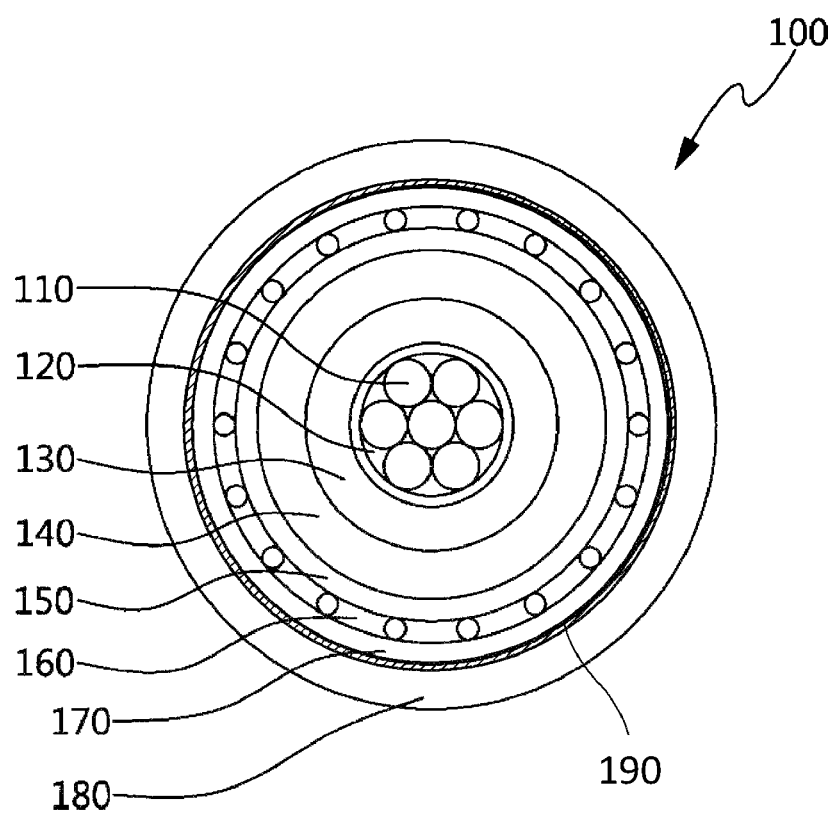
FIG. 2 is a view illustrating a self-extinguishing power cable with a microcapsule according to an embodiment of the present invention.
Figure 3:
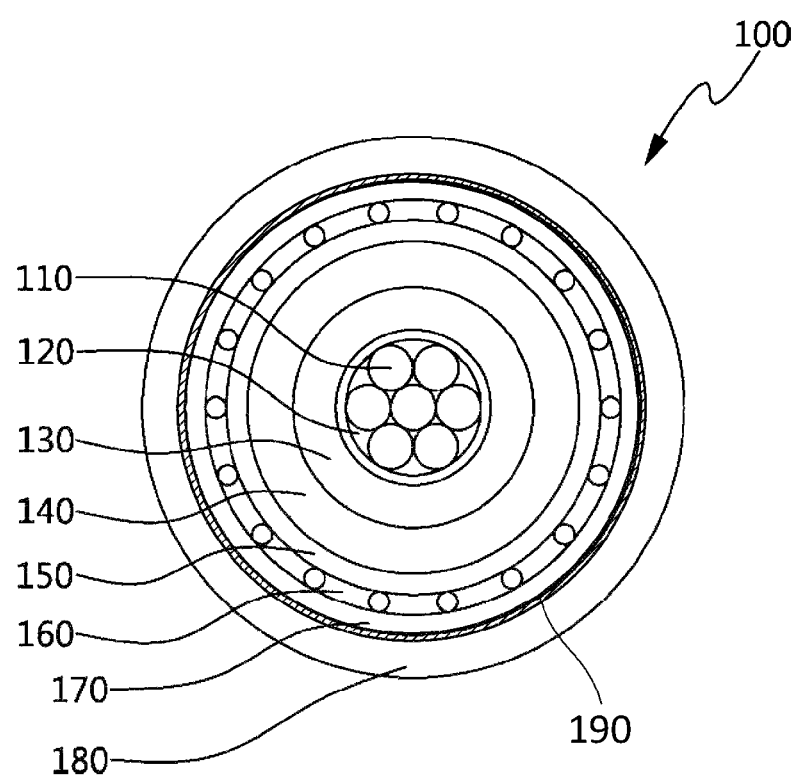
FIG. 3 is a cross-sectional view taken along line A-A' of the self-extinguishing power cable of FIG. 2.

FIG. 2 is a view illustrating a self-extinguishing power cable with a microcapsule according to an embodiment of the present invention. FIG. 3 is a cross-sectional view taken along line A-A' of the self-extinguishing power cable of FIG. 2.

As shown in FIGS. 2 and 3, a self-extinguishing power cable 100 (hereinafter, referred to as a "power cable") with a microcapsule according to the embodiment of the present invention includes a conductive layer 110, an inner semiconductive layer 120, an insulating layer 130, an outer semiconductive layer 140, a first neutral conductor water blocking layer 150, a concentric neutral conductor 160, a second neutral conductor water blocking layer 170, and an outer sheath layer 180. Here, the power cable 100 may be applied as a distribution power cable for a voltage of 22.9 kV or more.

The conductive layer 110 is a water blocking conductor having a water blocking structure of a compact-rounded stranded copper with a water blocking compound from a center of the cable.

The inner semiconductive layer 120 is made of a black semiconductive thermosetting high-purity compound or super smooth semiconductive compound material and is formed on the conductive layer 110.

The insulating layer 130 is made of a tree retardant XLPE compound material and is formed on the inner semiconductive layer 120.

The outer semiconductive layer 140 is made of a black semiconductive thermosetting high-purity compound material and is formed on the insulating layer 130.

The first neutral conductor water blocking layer 150 is a swellable (SW) tape which absorbs moisture when the moisture penetrates into the cable and has a function in which a portion thereof absorbing the moisture swells up to block a flow of the moisture. The first neutral conductor water blocking layer 150 is formed on a lower portion of the concentric neutral conductor 160.

The second neutral conductor water blocking layer 170 is an SW tape like the first neutral conductor water blocking layer 150 and is formed on an upper portion of the concentric neutral conductor 160.

As described above, the first and second neutral conductor water blocking layers 150 and 170 form water blocking layers on the upper and lower portions of the concentric neutral conductor 160.

Here, while the case has been described in which both of the first and second neutral conductor water blocking layers 150 and 170 are formed in the power cable 100, only one layer of the first neutral conductor water blocking layer 150 and the second neutral conductor water blocking layer 170 may be formed.

Here, the SW tape is formed by applying a superabsorbent polymer (SAP) exhibiting swelling characteristics due to moisture on a nonwoven fabric made of a polyester material (for example, polyethylene terephthalate (PET) or the like). Here, the nonwoven fabric has a thickness of 0.1 mm to 2 mm. The number of nonwoven tapes may be changed according to a wrapping ratio and may also be changed according to a thickness of the tape.

Specifically, the SW tape may have various layered structures as follows. First, the SW tape may include an upper layer, an intermediate layer, and a lower layer or include an upper layer and a lower layer and have a structure in which an SAP is inserted into the intermediate layer between the upper layer and the lower layer which are made of a nonwoven fabric. Alternatively, the SW tape may include an upper layer and a lower layer and may have a structure in which an SAP is stacked on the upper layer on the lower layer which is made of a nonwoven fabric.

A taping process of the SW tape may be performed by pre-manufacturing and taping a "nonwoven fabric coated with an SAP" or by primarily taping a "nonwoven fabric tape" and secondarily applying an SAP on a taped nonwoven fabric.

However, the first neutral conductor water blocking layer 150 may be a semiconductive SW tape, and the second neutral conductor water blocking layer 170 may be a nonconductive SW tape. To this end, a semiconductive material (for example, carbon black) may be additionally applied on the SW tape of the first neutral conductor water blocking layer 150 together with an SAP.

In particular, at least one of the first and second neutral conductor water blocking layers 150 and 170 includes the microcapsule 10 described with reference with FIG. 1. Both or any one of the first and second neutral conductor water blocking layers 150 and 170 may include the microcapsule 10. That is, due to the microcapsule 10 applied on a nonwoven fabric, an SW tape has a self-extinguishing function. Here, a content of the microcapsule 10 may be determined according to an allowable burn length in a vertical flame test of the cable.

In this case, an SW tape may be manufactured as follows according to a nonwoven fabric applying method of the microcapsule 10.

First, the microcapsule 10 may be applied between two nonwoven fabric layers. An SW tape may be manufactured by applying the microcapsule 10 between the two nonwoven fabric layers and then sealing the two nonwoven fabric layers.

In addition, the microcapsule 10 is applied on a separate nonwoven fabric. An SW tape may be manufactured in one tape form by stacking a nonwoven fabric in which the microcapsule 10 is applied between an upper nonwoven fabric and a lower nonwoven fabric.

Furthermore, an SW tape may be manufactured as a single SW tape by applying the microcapsule 10 on a single layered nonwoven fabric.

In the above-described three methods, the microcapsule 10 may be introduced concurrently when a water blocking powder or semiconductive carbon black is introduced while a nonwoven fabric having a water blocking function or a nonwoven fabric having a semiconductive function is manufactured.

Meanwhile, the microcapsule 10 is directly applied while a nonwoven fabric is wrapped. An SW tape may be manufactured immediately when the nonwoven fabric is wrapped while the microcapsule 10 is applied on the nonwoven fabric. In this case, only the microcapsule 10 may be applied after the nonwoven fabric having the water blocking function or the nonwoven fabric having the semiconductive function is manufactured.

When a flame occurs in the electrical power cable 100 and a nonwoven fabric of an SW tape is combusted, the capsule wall of the microcapsule 10 is broken. At this time, the active agent 11 filling the microcapsule is sprayed around the flame to extinguish the flame.

As described above, the microcapsule 10 may be formed in at least one layer of the first or second neutral conductor water blocking layers 150 and 170 disposed below the outer sheath layer 180. This is because, considering that a temperature of the outer sheath layer 180 in a molten state during injection-molding of the outer sheath layer 180 is more than 200° C., due to the allowable breakdown temperature of the microcapsule 10 in a range of 90° C. and 150° C., it is practically difficult to add the microcapsule 10 to the outer sheath layer 180 in an intact state when the power cable 100 is manufactured.

In other words, in general, in order to secure flame retardancy, a flame retardant compound material is used as a compound including a flame retardant filler in a jacket (or an outer sheath). Here, when the microcapsule 10 is applied, the microcapsule 10 may be easily broken due to strong shear and high temperature during a compounding process.

In addition, since the power cable 100 is provided with the microcapsule 10 therein, it is possible to suppress a series of occurrences of a vertical flame.

For example, describing a case in which only the outer sheath layer 180 includes a flame retardant material and ignition starts in the insulating layer 130, since a flame is suppressed from laterally spreading by the outer sheath layer 180 and is not extinguished, the flame may spread upwardly. That is, considering characteristics that the power cables 100 are installed in multiple layers so as to overlap each other, when only the outer sheath layer 180 includes the flame retardant material, a series of ignitions may be expected in which the flame spreads from a lower stage to an upper stage.

However, the microcapsule 10 may be provided inside the power cable 100, and thus, it may be possible to suppress the possibility of a series of ignitions of a flame occurring in the cable through a self-extinguishing function.

The concentric neutral conductor 160 is an annealed copper wire (encapsulating) formed between the first neutral conductor water blocking layer 150 and the second neutral conductor water blocking layer 170. In the case of a single-phase three wire system or a three-phase alternating current system, when a transformer is Y-connected, the concentric neutral conductor 160 is connected to a neutral point of the Y-connection.

The outer sheath layer 180 is a sheath made of a polymeric material such as polyvinyl chloride (PVC) or polyethylene (PE) that protects the power cable 100 against external damage or corrosion.

Additionally, the outer sheath layer 180 may include a polyolefin resin so as to have flame retardancy.

When the power cable 100 is an extra-high voltage cable, the power cable 100 may include a metal shielding layer 190 below the outer sheath layer 180. In this case, the microcapsule 10 may be applied in an upper portion or a lower portion of the metal shielding layer 190.

Figure 4:
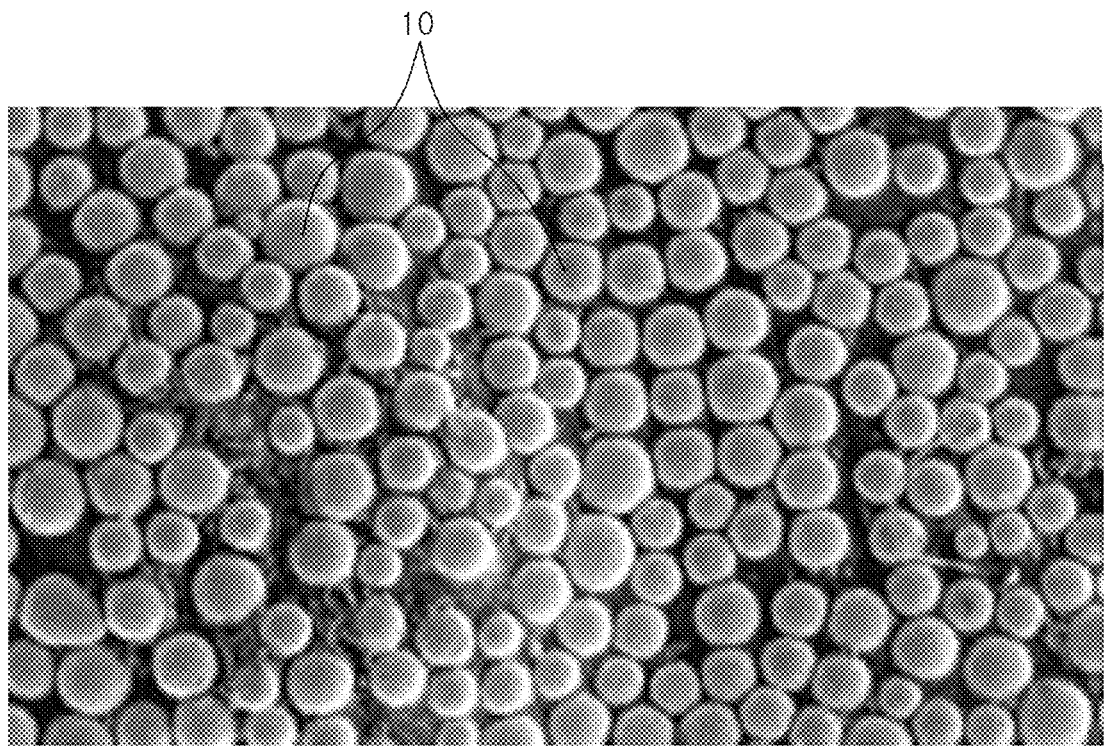
FIG. 4 is an image showing a state in which a microcapsule is applied on a nonwoven fabric according to an embodiment of the present invention.

FIG. 4 is a view illustrating a state in which a microcapsule is applied on a nonwoven fabric according to an embodiment of the present invention.

According to IEC 60332-3-24 regulating flammability performance which is currently applied, in a vertical flame test, a cable which is on fire should only be combusted within a maximum length of 0.75 m. For example, a currently available "water-proof type FR CNCO (FR CNCO-W)" has an allowable burn length of 0.75 m.

However, in such a burn standard, when cables are vertically stacked in seven layers, a cable in a top stage continues to be burned to a point on one side that is 5.25 m away from an ignition point.

Accordingly, the microcapsule 10 may be applied at an amount allowing a cable to be self-extinguished within 50% (0.37 m) of a burn length of 0.75 m according to a current standard in a vertical flame test on a cable of IEC 60332-3-24.

Figure 5:
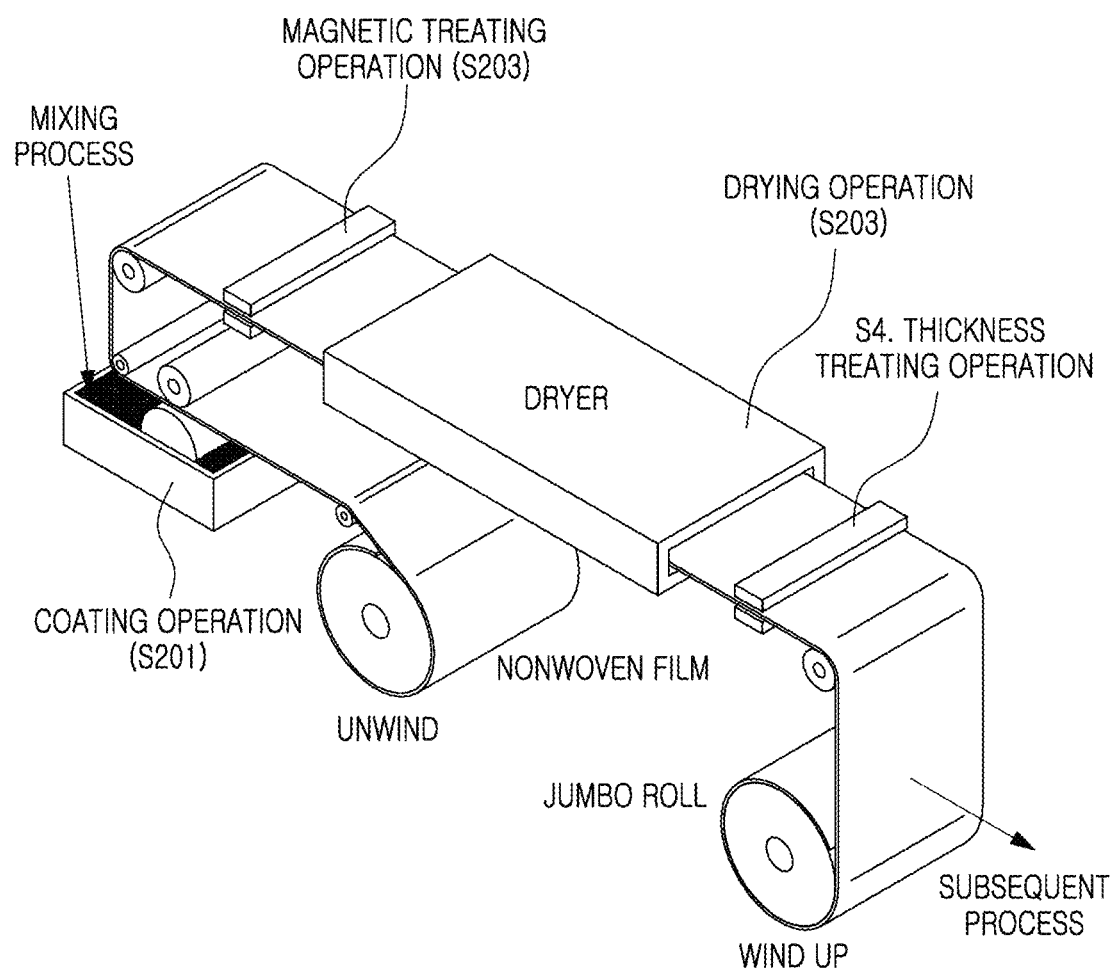
FIG. 5 is a view illustrating a method of manufacturing a self-extinguishing power cable with a microcapsule according to an embodiment of the present invention.

FIG. 5 is a view illustrating a method of manufacturing a self-extinguishing power cable with a microcapsule according to an embodiment of the present invention.

As shown in FIG. 5, a method for manufacturing a nonwoven fabric according to the embodiment of the present invention is a process of applying a microcapsule on a nonwoven fabric.

In coating operation S201, a mixed solution prepared through a mixing process is applied on one surface of a base film of the nonwoven fabric. Here, the mixed solution includes a water-soluble adhesive, a magnetic powder, an SW powder, and a microcapsule 10. Carbon black may also be mixed to exhibit semiconductivity.

The SW powder reacts with water to swell up in gel form. A roll-to-roll method is used in the coating operation S21. In order to apply the mixed solution on one surface of the nonwoven fabric, a roller in contact with one surface of the nonwoven fabric is operated in a state of being immersed in a water tank containing the mixed solution.

In the coating operation S201, the microcapsule 10 may be applied concurrently when the SW powder is applied, and thus, the microcapsule 10 may be easily applied on the nonwoven fabric without performing a separate process.

In magnetic treating operation S202, magnetic treating is performed such that the mixed solution to be applied on the nonwoven fabric is smoothly applied on a surface of the nonwoven fabric.

In drying operation S203, the mixed solution applied on the nonwoven fabric is dried by allowing the nonwoven fabric to pass through a drier.

In thickness treating operation S204, a nonwoven fabric film is additionally attached to the nonwoven fabric coated with the mixed solution so that the applied mixed solution is disposed inward from the nonwoven fabric film.

In this case, in the thickness treating operation S204, the nonwoven fabrics on both sides are smoothly pressed to form a jumbo roll while maintaining a constant thickness.

Then, a subsequent process is an operation of manufacturing an electrical power cable, and an SW tape is wound inside the electrical power cable to manufacture the electrical power cable.

However, the method of manufacturing the nonwoven fabric may be performed as follows.

In the coating operation S201, the adhesive and the microcapsule 10 may be mixed and applied on a nonwoven fabric, and in the thickness treating operation S204, a nonwoven fabric coated with the SW powder may be superimposed to manufacture a double-layered nonwoven fabric.

Alternatively, in the coating operation S201, the adhesive, the SW powder, and the microcapsule 10 may be mixed and applied on a nonwoven fabric, and in the thickness treating operation S204, a nonwoven fabric coated with the SW powder, a nonwoven fabric coated with the microcapsule 10, or a general nonwoven fabric may be superimposed to manufacture a multi-layered nonwoven fabric.

Alternatively, in the coating operation S201, the adhesive and the swellable powder may be mixed and applied on a nonwoven fabric, and in an operation before the drying operation S203, the microcapsule 10 in the form of powder may be sprayed on the nonwoven fabric coated with the adhesive and the SW powder.

Although the exemplary embodiments of the present invention have been described for illustrative purposes, a person skilled in the art will appreciate that various modifications and other equivalent embodiments are possible without departing from the essential characteristics of the present invention. It should be understood that the present invention is not limited to the foregoing particular embodiments but the technical scope of the present invention shall be defined by the technical spirit of the appended claims. In addition, it should be understood that the present invention shall embrace all modifications, equivalents, and substitutions within the spirit and scope of the present invention defined by the appended claims.

The invention claimed is:

1. A self-extinguishing power cable with a microcapsule, comprising:
    a conductive layer which has a water blocking structure of a compact-rounded stranded copper filled with a water blocking compound from a center thereof;
    an inner semiconductive layer which is formed on the conductive layer and is made of a semiconductive thermosetting high-purity compound material;
    an insulating layer which is formed on the inner semiconductive layer and is made of a tree retardant cross-linked polyethylene compound material;
    an outer semiconductive layer which is formed on the insulating layer and is made of a semiconductive thermosetting high-purity compound material;

a first neutral conductor water blocking layer which is formed on the outer semiconductive layer and is a semiconductive swellable tape;

a concentric neutral conductor which is formed on the first neutral conductor water blocking layer and is an annealed copper wire;

a second neutral conductor water blocking layer which is formed on the concentric neutral conductor and is a swellable tape; and an outer sheath layer which is formed on the second neutral conductor water blocking layer and is made of polyvinyl chloride (PVC) or polyethylene material, wherein a microcapsule filled with an active agent for extinguishing a flame is applied on at least one of the first neutral conductor water blocking layer and the second neutral conductor water blocking layer, wherein carbon black is applied on the swellable tape of the first neutral conductor water blocking layer.

2. The self-extinguishing power cable with the microcapsule of claim 1, wherein the microcapsule has a size of 5 μm to 100 μm and an allowable breakdown temperature of 90° C. and 150° C.

3. The self-extinguishing power cable with the microcapsule of claim 1, wherein a capsule wall of the microcapsule includes one material selected from among a melamine resin, a urethane resin, fumed silica, and a mixture of two or more thereof.

4. The self-extinguishing power cable with the microcapsule of claim 1, wherein the active agent includes one selected from among a liquid extinguishing agent, gas extinguishing agents, and a mixture of two or more thereof.

5. The self-extinguishing power cable with the microcapsule of claim 4, wherein the liquid extinguishing agent is fluorocetone (dedecafluoro-2-methylpentan-3-one) and the gas extinguishing agents is any one of carbon dioxide (CO2) and chlorofluorocarbon (CFC).

6. The self-extinguishing power cable with the microcapsule of claim 1, wherein the swellable tape of each of the first neutral conductor water blocking layer and the second neutral conductor water blocking layer is formed by applying a superabsorbent polymer (SAP) on a nonwoven fabric made of a polyester material.

7. The self-extinguishing power cable with the microcapsule of claim 1, further comprising a metal shielding layer disposed below the outer sheath layer.

* * * * *